United States Patent Office 2,730,235
Patented Jan. 10, 1956

2,730,235

LIQUID SEPARATING MEDIUM AND USE THEREOF

Jerome Swimmer, Chicago, Ill.

No Drawing. Application October 24, 1952,
Serial No. 316,770

14 Claims. (Cl. 209—166)

My invention relates principally to a new and novel liquid separating medium and to the use thereof in the separation of mixtures of solids. More specifically, my invention relates to a new and novel liquid separating medium having a greater density than that of the diamond and to the use thereof in the separation of diamonds from other solids.

The application of the Archimedean principle to the separation of mixtures containing solids of different densities has long been known. Under ideal conditions, on adding a mixture of two or more solids of different densities to a liquid of greater density than at least one but less than all of the solid species in the mixture and of lesser density than at least one but less than all of the solid species in the mixture, the solid species having a lower density than the liquid will float on the liquid while the solid species having a greater density than the liquid will sink therein, whereby a partial or, if but two solid species are present, a complete separation of the solids in the original mixture is effected. Very frequently, even a partial separation effected by this method and means is, from a practical standpoint, a complete separation. Thus, in a mixture of three or more solids of different densities, if the desired solid is either the most dense or the least dense of all species present and if the liquid separating medium is of suitable density then, under ideal conditions, it is possible either to float all the unwanted components of the mixture or to float the single desired species of the mixture, thereby in either case effecting a commercially complete separation.

While the separation process briefly described above is extremely simple in principle, in actual practice many difficulties are encountered. Frequently, an otherwise suitable liquid separation medium does not wet the solids in the mixture or exhibits a differential wetting action towards the various solid species present. Under such circumstances the Archimedean principle is not operative for, as is well known, a solid, especially a finely divided solid, that is not wet by a liquid will float on the liquid even though its density may be many times as great as the density of the liquid. It should be mentioned however that in some instances the differential wetting effect of a liquid with respect to two or more solids makes possible separations that would be impossible to achieve on a strict density difference basis.

Very frequently, high density liquids exhibit a high viscosity and such viscous materials are far from ideal as liquid separating media, especially if an attempt is made to separate a mixture of finely divided solids. With such liquids, the settling rate and the rising rate is much slower than with liquids of ordinary viscosity, this effect becoming more pronounced as the particle size of the solids decreases so that separation times are inordinately long and, with solids of small particle size, are impossibly long.

Probably the most frequently encountered difficulty in the separation of solids through use of a liquid separation medium stems from the fact that liquids, as a class, are materials of comparatively low density while solids, as a class, are materials of comparatively high density. The liquid separation process requires that the separating medium have a density greater than at least one of the solids present which condition almost invariably means a liquid of unusually high density. Very frequently it is difficult or impossible to find a liquid of the required high density. The diamond, for example, in pure and well crystallized form, has a specific gravity of about 3.52. The diamond is frequently associated with a variety of solids, some of which are more dense and some of which are less dense than diamond itself. Thus diamond may be in admixture with quartz (specific gravity 2.653), blue ground (specific gravity 2.7), silicon carbide (specific gravity 3.17), garnet (specific gravity variable, averaging about 3.8), corundum (specific gravity 4.0), titanium dioxide (rutile, specific gravity 4.2), zircon (specific gravity 4.0–4.8), tungsten carbide (specific gravity around 16.0), and the like.

Acetylene tetrabromide (specific gravity 2.95) is a liquid of low viscosity and of fairly good wetting power and is capable of floating quartz and blue ground from the diamond but leaves the diamond admixed with any solids having a density greater than this particular separation medium.

Methylene iodide (specific gravity 3.325) also is a liquid of low viscosity and of good wetting power and is capable of floating such materials as quartz, blue ground and silicon carbide from diamonds but again this leaves the diamond admixed with any solids having a density greater than that of this particular separation medium.

Various suspensions have also been employed as separation media. A recently developed separation process of this type involves the use of a suspension of ferro silicon. Very complicated methods and means must be employed to maintain the solid in suspension and the resulting suspension is of only moderate density, having a specific gravity of about 2.87 in the upper portion of the separation column and of about 2.97–3.05 in the lower portion of the column. While such a suspension will separate quartz and blue ground from diamond, here too the diamond remains admixed with any solids having a density greater than that of the suspension. Also, it is evident that the suspension is not a classified liquid. It is not operative with respect to diamond particles smaller than 35–48 mesh and is operable only with difficulty with particles smaller than 10 mesh. Also, suspensions of this kind are of high viscosity, resulting in inordinately slow sinking and floating rates.

Also, it is common practice to employ a rapidly moving stream of a liquid or a suspension as a separation medium. In such processes, the motion of the fluid tends to overcome, in some measure at least, the density deficiency of the liquid so that water, for example, may be used to "float" a material such as quartz even though the specific gravity of quartz is 2.653. An example of such a moving fluid separation process will be described in some detail subsequently in connection with the jigging of diamond concentrates. Such separation methods require the expenditure of large amounts of mechanical energy (to maintain motion in the fluid) and the resulting separations are far from complete and far from exact, becoming increasingly incomplete and inexact as the particle size of the solid mixture decreases. Also, the successful employment of the moving liquid stream separation method requires that the mixture of solids charged to the process exhibit a quite limited range of particle sizes and, further, that the particle size distribution within said quite limited range of all individual solid species in the mixture be approximately the same. If these two criteria are not satisfied, small particles of high density solids tend to accumulate with larger particles of low density solids.

Many attempts have been made to develop a liquid separation medium more dense than the diamond to enable the diamond to be floated from denser materials. Probably the most frequently suggested liquid separation medium for this purpose is an aqueous solution of thallous formate or, more particularly, an aqueous solution of thallous formate and malonate. While high density solutions can be produced by use of such salts, such liquid separation media show many disadvantages. In the first place, thallium is a comparatively rare element and accordingly thallium salts are quite expensive. Furthermore, thallium salts are powerful systemic poisons. Solutions of thallous formate or thallous formate and thallous malonate are viscous and do not properly wet the diamond and other solids commonly associated with the diamond. Also, solutions of these salts sufficiently concentrated to be useful for the purpose set forth previously must be kept and used warm in order to prevent crystallization of the salts contained therein.

A few other solutions have been suggested as ultra high density separation media but all of these have so many disadvantages (high viscosity, poor wetting power, reactivity with moisture, operative only at elevated temperatures, et cetera) as to preclude their acceptance in industry.

Due to the difficulties accompanying the employment of the various prior art physical separation processes, in many instances resort has been had to various chemical processes for the separation of diamond from admixed solids. One such method involves the oxidation of such adventitious solids by high temperature ignition with access to air followed by removal of oxidized material through suitable chemical reactions. Such methods are of limited applicability and are otherwise highly disadvantageous. Many materials commonly associated with diamond are not susceptible to oxidation and accordingly are not amenable to such separation processes. Also, diamond, especially bort of small particle size, is readily oxidized at high temperatures. Borts from various sources and of various categories show marked differences in their resistance to oxidation. Thus, six different bort samples, all of 65 to 100 mesh size, were separately heated in a muffle furnace under oxidizing conditions for 30 minutes at 700° C. The losses in weight suffered by the six samples were in the range 5.3 to 56.5%, the average loss being 26.4%. Since a 5% oxidation loss of bort is considered to be about the limit for commercial practice, it is evident that the thermal oxidation process, in addition to being of limited applicability, must be employed with extreme care. The majority of the six borts here tested exhibited more than the previously mentioned permissible loss after only 5 minutes at 700° C.

In an attempt to avoid excessive oxidation of bort, chemical oxidation methods have been employed in an attempt to separate diamond from admixed solids. One such suggested method may be briefly described as follows: The diamond containing powder (recovered from diamond wheel grinding operations) is first treated with hydrochloric acid. When reaction ceases, nitric acid is added and the reaction is continued in the presence of the resulting aqua regia, the reaction being finally completed at the boiling point. The resulting solids are washed by decantation, are dried and then are fused with potassium hydroxide just below red heat. The fusion product is leached with water (finally at the boiling point) and the remaining solids are washed by decantation. The washed solids are again treated with hydrochloric acid followed by the addition of nitric acid as previously described. The solids remaining from this second acid treatment are washed by decantation and are covered by an acidified potassium bichromate solution to produce a water repellent surface on the diamonds present. The diamonds are then "floated" (from silicon carbide) at 75° C., using a more dilute potassium bichromate solution, the process being repeated until all possible diamond powder has been recovered. If the thus separated diamonds are still contaminated with silicon carbide a second potassium hydroxide fusion and a third acid treatment followed by a second flotation must be applied. Finally, the separated diamonds are heated in air at 500° C. for 30 minutes to remove non-diamond carbonaceous material from the surfaces of the stones.

It is evident that the above briefly described chemical oxidation process is of limited applicability and highly disadvantageous. Many substances commonly associated with diamond cannot be oxidized by the chemical procedure described. In those instances where the diamond containing mixture is amenable to the described chemical oxidation process it is self evident that the process is extremely tedious.

One object of my invention is to provide a new and novel liquid separating medium of high density.

A further object of my invention is to provide a new and novel liquid separating medium of low viscosity and of high density.

An additional object of my invention is to provide a new and novel liquid separating medium of good wetting power and of high density.

Another object of my invention is to provide a new and novel liquid separating medium of low viscosity and good wetting power and of high density.

A further object of my invention is to provide a new and novel process for the separation of admixed solids of different densities.

An additional object of my invention is to provide a new and novel process for the separation of diamonds from admixed solids.

Yet another object of my invention is to provide a new and novel process for the separation of diamonds from admixed solids by use of a new and novel liquid separating medium having a density greater than that of the diamond.

A still further object of my invention is to provide a new and novel process for the separation of diamonds from admixed solids by use of a new and novel liquid separating medium of low viscosity and having a density greater than that of the diamond.

An additional object of my invention is to provide a new and novel process for the separation of diamonds from admixed solids by use of a new and novel liquid separating medium of good wetting power and having a density greater than that of the diamond.

Another object of my invention is to provide a new and novel process for the separation of diamonds from admixed solids by use of a new and novel liquid separating medium of low viscosity and good wetting power and having a density greater than that of the diamond.

A further object of my invention is to provide a new and novel process for the separation of admixed solids of different densities and intermixed random particle sizes.

An additional object of my invention is to provide a new and novel process for the separation of diamonds from admixed solids of intermixed random particle sizes.

Still another object of my invention is to provide a new and novel process for the separation of diamonds of intermixed random particle sizes from admixed solids.

A further object of my invention is to provide a new and novel process for the separation of diamonds of intermixed random particle sizes from admixed solids of intermixed random particle sizes.

Yet an additional object of my invention is to provide a new and novel process for the separation of admixed solids of different densities and of intermixed random particle sizes ranging downward to one micron or less.

Yet another object of my invention is to provide a new and novel process for the separation of diamonds from admixed solids of intermixed random particle sizes ranging downward to one micron or less.

A further object of my invention is to provide a new and novel process for the separation of diamonds of intermixed random particle sizes ranging downward to one micron or less from admixed solids.

An additional object of my invention is to provide a new and novel process for the separation of diamonds of intermixed random particle sizes ranging downward to one micron or less from admixed solids of intermixed random particle sizes ranging downward to one micron or less.

Other objects of my invention will become apparent as the description thereof proceeds.

The new and novel liquid separation medium of my invention consists principally of a solution of iodomethyl mercury iodide, $ICH_2HgI$, in methylene iodide.

As previously mentioned, pure and well crystallized diamond has a specific gravity of around 3.52. However, materials designated as diamonds exhibit specific gravities in the range 3.15 to 3.53. Carbonado, for example, has a specific gravity of from 3.15 to 3.29 and obviously the new and novel liquid separating medium of my invention is not essential for the seeparation of this variety of the mineral from more dense materials since previously available materials, for example, methylene iodide, are suitable for such purposes. However, my new and novel liquid separating medium can be employed in this separation if desired. Ballas, consisting of spherical concretions of small diamonds has a somewhat lesser density than pure and well crystallized diamonds as does true bort which is a poorly crystallized diamond, often exhibiting a radial fibrous structure. Both ballas and true bort require the new and novel liquid separation medium of my invention for separation from materials of greater density. (The term, fragmented bort, is applied, for example, to the material produced by crushing of well crystallized diamonds with so many flaws as to preclude the preparation of gem stones therefrom. Such borts have exactly or nearly the same density as pure and well crystallized diamond.)

Even at room temperature it is easily possible to dissolve sufficient iodomethyl mercury iodide in methylene iodide to give a solution of greater density than that of pure and well crystallized diamond. For example, such a solution, containing 39–40% by weight of iodomethyl mercury iodide has a specific gravity of 3.62, some ten points higher than the specific gravity of pure and well crystallized diamond. A solution of this concentration is essentially saturated at room temperature although it is to be noted that supersaturated solutions of even greater density are readily formed by this system and these supersaturated solutions remain stable over considerable periods of time. Also, as would be expected, the solubility of iodomethyl mercury iodide in methylene iodide increases with increasing temperatures. Thus, at temperatures approching the boiling point of the solvent, the solubility of iodomethyl mercury iodide therein is two or three times as great as at room temperature. Obviously, solutions of iodomethyl mercury iodide supersaturated at room temperatures as well as solutions of iodomethyl mercury iodide saturated or essentially saturated at elevated temperatures have higher densities than solutions of iodomethyl mercury iodide saturated or essentially saturated at room temperatures. Solutions of iodomethyl mercury iodide in methylene iodide are characterized by a low viscosity and high wetting power; in fact, such solutions wet diamonds better (i. e. exhibit a lower contact angle toward diamond) than methylene iodide itself.

The required iodomethyl mercury iodide is easily prepared by the catalyzed photochemical reaction between metallic mercury and methylene iodide. The product of this reaction is a solid mass of crystals having a slight greenish-yellow cast. The reaction product consists principally of iodomethyl mercury iodide. There also may be present some $H_2C(HgI)_2$ and possibly traces of $HC(HgI)_3$. The compound $H_2C(HgI)_2$ is obviously formed by the bridging of both carbon-iodine linkages of methylene iodide with a mercury atom while $HC(HgI)_3$ results from a similar reaction involving the three carbon-iodine linkages of iodoform. (Methylene iodide is commonly prepared by reduction of iodoform and material so prepared is frequently contaminated with traces of iodoform.)

For obvious reasons, it is not necessary to isolate or purify the iodomethyl mercury iodide formed as a result of the above described reaction. Sufficient methylene iodide is added to the reaction product to give a solution having a density of the required value and the resulting solution, after filtration if desired, is employed in the separation processes of my invention.

Illustrative but non limiting examples describing the application of my new and novel liquid separating medium to the separation of diamonds from contaminating solids will now be given.

A considerable portion of the world production of diamonds is obtained from blue ground, found at a few localities in South Africa. Since this material has a diamond content averaging only about 0.000006%, it is obvious that the separation of the desired mineral from the gangue is a problem of considerable magnitude.

In general, the blue ground is first crushed (which operation, unfortunately, fractures any unusually large diamonds that may be present) and is then fed to agitated wash tanks through which water is flowing. Most of the blue ground and other low density contaminants pass from the top of the washers while heavier material, representing about 1% of the original charge, settles to the bottom of the washers. (The previously described ferrosilicon suspension is employed at some mines to effect this primary separation.)

Bottoms from the wash tanks are subjected to a careful sieve separation into a series of fractions of different mesh sizes and these fractions are separately charged to a series of pulsating jigs provided with bottom screens having perforations of a size appropriate to that of the sieved fraction charged. The screen perforations are sealed with a layer of metallic ball checks of appropriate size. A pulsating stream of water is passed upward through the screens. This carries low density materials from the top of the jig while high density materials escape through the screen to a collecting box below the jig.

The jiggled bottoms are then passed over a laterally oscillating slightly sloping iron table covered with a layer of grease. The grease preferentially wets larger diamond particles, certain metallic minerals and any metallic particles that may be present. These stick to the grease layer while gangue and smaller diamond particles are gradually shaken from the greasers to waste. From time to time the grease layer is removed from the greasers and is heated on a suitable screen whereby the grease melts and flows from the diamond concentrate. The diamonds are removed by hand from other materials present in the concentrate and are then sorted with respect to grade and size.

A considerable portion of world diamond production is now obtained from river or alluvial diggings. The separation processes here employed are essentially similar to those described with respect to blue ground, involving a preliminary separation by water washing followed by jigging and greasing.

The diamond is a mineral of comparatively low density. While the density of the diamond is greater than that of quartz and blue ground, for example, the difference is not too great. Accordingly, in the above described washing and jigging operations, the separation must be quite efficient to avoid passage of diamonds overhead with low density materials. Even with inefficient separations the loss of diamonds, especially diamonds of small size, is excessive and even small diamonds are quite valuable as will hereinafter appear.

The greasers are highly efficient with respect to practically all diamonds suitable for gem purposes but their efficiency is markedly less with respect to diamonds of small size and material suitable for bort and diamond powders. With the advent in recent years of widespread demand for industrial diamond powders for the manufacture of diamond grinding and cutting wheels and similar applications, it has been found profitable to rework the tailings from previous gem stone recovery processes as well as to work new diggings for the separation of material for industrial use. Mass recovery methods, such as the use of the ferrosilicon heavy medium and the electrostatic charge separation process must be employed in the recovery of such materials since, obviously, hand picking is quite impossible for the recovery of fine diamond particles.

Furthermore, it is evident that all steps of the briefly described separation process require large, expensive and complicated equipment, all of which must be operated and controlled with consummate skill if maximum discard of gangue and minimum loss of diamonds is to be achieved. Also, certain of the conventional separation steps require large quantities of water which is frequently obtained only with difficulty and this water must be well agitated in the washers and must be supplied to the jiggers by means of high pressure, high capacity pumps, necessitating the expenditure of large quantities of power.

It is evident that my new and novel liquid separating medium can be applied to the separation of diamonds at any point of the conventional separation process briefly described above. My new and novel liquid separating medium can be advantageously employed for the separation of diamonds from the conventional charge to the jigs, from the conventional charge to the greasers, from the product of the greasers, from the product of the greasers after hand picking of gem stones, from the jig tailings, from the greaser tailings, et cetera.

It is evident that when applying my new and novel liquid separating medium to the bottoms from the washers it is unnecessary to sieve these bottoms to produce fractions of a narrow range of particle sizes appropriate for particular jigs as is required in the conventional separation process.

In contrast to conventional separation procedures, my new and novel separation process is of the utmost simplicity. If the selected charge to my new and novel separation process contains minerals of lower density than diamond, the charge is first added to methylene iodide. This material quickly wets all components of the charge and crystallized diamond and heavier materials sink while materials having a specific gravity less than 3.325 float. This occurs regardless of whether the charge consists of admixed solids exhibiting a narrow range of particle sizes or admixed solids of random intermixed particle sizes of the widest particle size range. Furthermore, it is not necessary that the particle size distribution of any one solid species even approximate that of any other solid species in the charge. The float fraction is separated and, after liquid recovery, is disposed of as desired. The heavier materials are removed from the methylene iodide and, after liquid recovery if desired, are then added to the new and novel liquid separating medium of my invention. Here again, all components of the mixture are wetted by the medium and the diamonds float while other materials sink. Once more the desired separation does not require that the charge to my new and novel liquid separating medium exhibit a narrow range of particle sizes. The charge may consist of admixed solids of intermixed random particle sizes of the widest particle size range and it is not necessary that the particle size distribution of any one solid species even approximate that of any other solid sepecies. The diamonds are separated and are washed with several portions of hot methylene iodide followed by washing with several portions of a hot, monohydric lower aliphatic alcohol such as methanol, ethanol, isopropanol, and the like, methanol being preferred. The heavier materials are separated, similarly washed, and disposed of as desired.

The methylene iodide used to wash the diamonds and the heavier materials picks up some iodomethyl mercury iodide. This washing liquor may be used repeatedly and gradually increases in gravity as more and more iodomethyl mercury iodide is recovered. This wash liquor, after picking up considerable iodomethyl mercury iodide, may be concentrated to give my new and novel liquid separation medium, for example, by distillation, preferably under reduced pressure. Or, the wash liquor may be cooled to appreciably below room temperature, whereby a portion of the iodomethyl mercury iodide therein separates, especially if "seeds" are present. The resulting solid may be employed to prepare additional high density liquid separating medium while the mother liquor may be heated and used as a wash liquor.

The alcohol (preferably methanol) picks up methylene iodide and, in some instances, small traces of iodomethyl mercury iodide. As before, this washing liquor may be used repeatedly. Methylene iodide (plus any traces of iodomethyl mercury iodide that may be present) may be recovered from this wash solution by removal of alcohol therefrom, for example, by distillation.

Preferably, the several portions of either or both of the wash liquors are applied to the solids in accordance with the well known countercurrent principle.

My new and novel liquid separation medium may also be applied to blue ground, river or alluvial diggings or tailings from the washers if desired but due to the extremely low diamond content of these materials it is hardly economic to do so.

Powders recovered from diamond wheel grinding or cutting operations are also amenable to the new and novel separation process of my invention. Diamond wheels contain finely crushed diamonds held in a suitable matrix of a resin, a low melting metal or alloy, or other similar suitable material. Depending upon the service for which the wheel is designed, the diamond powder contained therein may vary from as large as 10 mesh or even larger down to as fine as 800 mesh or even smaller in average particle size. During use, diamond grinding wheels gradually wear away and it is common practice to collect the resulting dust (which is admixed with the dust resulting from the operations performed on the work piece) and recover the diamond powder therefrom. This recovered dust may contain, in addition to diamond powder, such materials as (lapping) oils, silicon carbide, tungsten carbide, resins, metals, glass, granite, marble, slate, corundum, et cetera, derived from the wheel and/or the work piece and/or materials employed to facilitate the grinding or cutting operation. The exact composition of the dust depends upon the nature of the wheel and work piece and the nature of any grinding aids that may have been employed. More frequently than not, the powder charge to the separation process is a mixture of powders recovered from a wide variety of operations with a wide variety of wheels so that it may well contain all of the materials mentioned together with additional substances and may exhibit a rather extensive range of particle sizes.

In the recovery of diamond powder from diamond wheel dust it is common practice (after any desirable preliminary operations such as deoiling, et cetera) to separate materials less dense than diamond such as silicon carbide (specific gravity 3.17) by flotation with a moderately dense liquid separation medium such as methylene iodide. The sink fraction obtained in the operation is a problem and is usually treated by a thermal or chemical oxidation process such as has been previously described. Such methods are extremely tedious and frequently result in the destruction of an appreciable amount of the diamond powder present and fail to eliminate certain contaminating solids. In spite of the many disadvantages of such oxidation processes they are employed in preference to any of the ultra high density liquid separating media of the prior art. Thus, attempts to apply thallous formate and malonate solutions to such separations results in an intractable mess. Due to the low wetting power and rather high viscosity of the medium and the small particle size of the dust it is difficult to separate diamond even from tungsten carbide by such methods and means in spite of the fact that tungsten carbide is several times as dense as diamond.

As will now be perfectly obvious, the separation of diamond powder from the previously mentioned sink fraction by use of the new and novel liquid separating medium of my invention is quite simple. The solution of iodomethyl mercury iodide in methylene iodide readily wets all components of the sink fraction and the diamonds therein float to the top, the separation being quite rapid as a result of the low viscosity of the separating medium. Since the separation medium of my invention is a classical liquid (in distinction to a suspension), centrifugal force may be employed, if desired, to increase the rate of formation of the sink fraction and the float fraction. Since the downward force on a solid particle suspended in a classical liquid is directly proportional to the gravitational constant and it is evident that, since the use of centrifugal force in effect increases this constant, this assists in the separation and is of special benefit when the particle size is very small as frequently occurs when dealing with powders from diamond wheel grinding or cutting operations.

The diamond layer is separated, washed as previously described and is, after grading with respect to particle size, eminently suitable for the production of new diamond wheels. The heavy material is separated from the medium, is preferably washed as previously described, and is disposed of as desired.

While the application of my new and novel liquid separating medium to the separation of admixed solids has been specifically described in connection with the separation of diamond from admixed solids it is to be understood that the particular examples given herein are employed for illustrative purposes only and that my invention is of broader scope than the limited field encompassed by said examples. The new and novel liquid separating medium of my invention may be employed to float any desired solid or mixture of solids of lower density than the medium from any solid or mixture of solids of greater density than the medium. Similarly, the new and novel liquid separating medium of my invention can be employed to float any solid or mixture of solids of lesser density than the medium and thereby separate as a sink fraction a desired solid or mixture of desired solids of greater density than that of the medium.

Also, as has been set forth previously, the successful application of my new and novel liquid separating medium does not require that the mixture of solids charged exhibit a quite limited range of particle sizes or that the particle size distribution within said quite limited range of all the individual species in the mixture be approximately the same. The new and novel liquid separating medium of my invention is applicable to a charge of admixed solids of intermixed random particle sizes and of the widest possible particle size range. Furthermore, it is not necessary that the particle size distribution of one solid species in the charge even approximate the particle size distribution of any other solid species present. In addition, the new and novel liquid separating medium of my invention can be employed to separate mixtures of solids of extremely small particle size, even one micron or less, and, if desired, the velocity of separation may be increased by the application of centrifugal force.

As will be obvious from the previous discussion, the new and novel liquid separating medium of my invention can be prepared with specific gravities ranging from a little above that of methylene iodide to above 3.6. If supersaturated solutions are employed or if the medium is maintained at an elevated temperature, it is possible to achieve specific gravities greater than this without loss of wetting power or appreciable increase in viscosity.

Also, my new and novel liquid separating medium is widely useful in the mineralogical and related sciences for purposes of identification, characterization, and the like.

Be it remembered, that while my invention has been described in connection with specific details and specific examples thereof, these are illustrative only and are not to be considered limitations on the spirit or scope of said invention except in so far as these may be incorporated in the appended claims.

I claim:

1. A method of separating a mixture of solids of different densities, at least one of said solids having a specific gravity below about 3.62 and at least one other of said solids having a specific gravity above about 3.33, comprising treating said mixture with a solution of iodomethyl mercury iodide in methylene iodide, said solution having a greater density than at least one but less than all of said solids and a lesser density than at least one but less than all of said solids, to produce a sink fraction and a float fraction.

2. The method of claim 1, further characterized by the fact that the mixture of solids is charged continuously to the liquid separating medium and the sink fraction and the float fraction are removed continuously from the liquid separating medium.

3. A method of separating a mixture of solids of different densities, said mixture consisting of solids A having a specific gravity within the approximate range 3.33 to 3.62 and solids B having a specific gravity above that of solids A, comprising treating said mixture with a solution of iodomethyl mercury iodide in methylene iodide, said solution having a greater density than solids A and a lesser density than solids B, to produce a float fraction of solids A and a sink fraction of solids B.

4. A method of separating a mixture of solids of different densities, said mixture consisting of solids A having a specific gravity above about 3.33 and solids B having a specific gravity below that of solids A, comprising treating said mixture with a solution of iodomethyl mercury iodide in methylene iodide, said solution having a lesser density than solids A and a greater density than solids B, to produce a sink fraction of solids A and a float fraction of solids B.

5. A method of separating a mixture of at least three solids species, said mixture consisting of solids A having a specific gravity within the aproximate range 3.33 to 3.62, solids B of lesser density than said solids A and solids C of greater density than said solids A, comprising treating said mixture with a solution of iodomethyl mercury iodide in methylene iodide, said solution having a greater density than solids A and a lesser density than solids C, to produce a sink fraction of solids C and a float fraction of solids A and B, treating said float fraction with a solution of iodomethyl mercury iodide in methylene iodide, said solution having a lesser density than solids A and a greater density than solids B, to produce a second float fraction of solids B and a second sink fraction of solids A.

6. A method of separating a mitxure of at least three solids species, said mixture consisting of solids A having a specific gravity within the approximate range 3.33 to 3.62, solids B of lesser density than said solids A and solids C of greater density than said solids A, comprising treating said mixture with a solution of iodomethyl mercury iodide in methylene iodide, said solution having a lesser density than solids A and a greater density than solids B, to produce a float fraction of solids B and a sink fraction of solids A and C, treating said sink fraction with a solution of iodomethyl mercury iodide in methylene iodide, said solution having a greater density than solids A and a lesser density than solids C, to produce a second float fraction of solids A and a second sink fraction of solids C.

7. A method of separating diamonds in admixture with solids of greater density than diamond, comprising treating said mixture with a solution of iodomethyl mercury iodide in methylene iodide, said solution having a density greater than that of diamond and less than that of the admixed solids, to produce a diamond float fraction.

8. A method of separating diamonds in admixture with solids of greater density than diamond, comprising treating said mixture with a solution of iodomethyl mercury iodide in methylene iodide, said solution having a density greater than that of diamond and less than that of the admixed solids, to produce a diamond float fraction, washing said float fraction with hot methylene iodide and finally washing said float fraction with hot methanol.

9. A method of separating diamonds in admixture with solids of greater density than diamond, comprising treating said mixture with a solution of iodomethyl mercury iodide in methylene iodide, said solution having a density greater than that of diamond and less than that of the admixed solids, to produce a diamond float fraction, washing said float fraction with hot methylene iodide, washing the methylene iodide-washed float fraction with hot methanol, removing methanol from the methanol wash liquor, admixing said demethanolized wash liquor with the methylene iodide wash liquor, removing sufficint methylene iodide from the resulting mixture to produce a solution having a density greater than that of the diamond and less than that of said admixed solids and recycling said solution to the separation zone.

10. A method of separating diamonds in admixture with solids of greater density than diamond, comprising treating said mixture with a solution of iodomethyl mercury iodide in methylene iodide, said solution having a density greater than that of diamond and less than that of the admixed solids, to produce a diamond float fraction, washing said float fraction with hot methylene iodide, washing the methylene iodide-washed float fraction with hot methanol, removing and recovering methanol from the methanol wash liquor, admixing the resulting demethanolized wash liquor with the methylene iodide wash liquor, removing and recovering sufficient methylene iodide from said mixture to produce a solution having a density greater than that of diamond and less than that of said admixed solids, recycling said solution to the separation zone, recycling said recovered methylene iodide to the hot methylene iodide washing zone and recycling said recovered methanol to the hot methanol washing zone.

11. A method of separating diamonds in admixture with solids of greater density than diamond, comprising treating said mixture with a solution of iodomethyl mercury iodide in methylene iodide, said solution having a density greater than that of diamond and less than that of the admixed solids, to produce a diamond float fraction, washing said float fraction with hot methylene iodide, washing the methylene iodide-washed float fraction with hot methanol, mixing the methylene iodide and methanol wash liquors, removing methanol from said mixture, removing sufficient methylene iodide from said demethanolized mixture to produce a solution having a density greater than that of diamond and less than that of said admixed solids and recycling said solution to the separation zone.

12. A method of separating diamonds in admixture with solids of greater density than diamond, comprising treating said mixture with a solution of iodomethyl mercury iodide in methylene iodide, said solution having a density greater than that of diamond and less than that of the admixed solids, to produce a diamond float fraction, washing said float fraction with hot methylene iodide, washing the methylene iodide-washed float fraction with hot methanol, mixing the methylene iodide and methanol wash liquors, removing and recovering methanol from said mixture, removing and recovering sufficient methylene iodide from said demethanolized mixture to produce a solution having a density greater than that of diamond and less than that of the admixed solids, recycling said solution to the separation zone, recycling said recovered methylene iodide to the hot methylene iodide washing zone and recycling said recovered methanol to the hot methanol washing zone.

13. The method of claim 12, further characterized by the fact that the sink fraction of said admixed solids is separately washed as claimed with respect to the diamond float fraction, the sink fraction wash liquors are combined with the diamond float fraction wash liquors and the resulting mixture is worked up as claimed with respect to the diamond float fraction wash liquors, and the recovered methylene iodide is recycled to the sink fraction hot methylene iodide washing zone and the float fraction hot methylene iodide washing zone and the recovered methanol is recycled to the sink fraction hot methanol washing zone and the float fraction hot methanol washing zone.

14. A method of separating diamonds in admixture with solids of greater density than diamond, comprising treating said mixture with a solution of iodomethyl mercury iodide in methylene iodide, said solution having a density greater than that of diamond and less than that of the admixed solids, to produce a diamond float fraction and an admixed solids sink fraction, washing the float fraction with hot methylene iodide, washing the methylene iodide-washed float fraction with a hot lower aliphatic monohydric alcohol, washing the sink fraction with hot methylene iodide, washing the methylene iodide-washed sink fraction with a hot lower aliphatic monohydric alcohol, combining the methylene iodide wash liquors, separating at least a portion of the iodomethyl mercury iodide from said methylene iodide wash liquors and recycling the resulting mother liquor to the hot methylene iodide washing zones, combining the alcoholic wash liquors, separating the alcohol from said wash liquors and recycling said alcohol to the hot alcohol washing zones and recycling the methylene iodide to the hot methylene iodide washing zones.

References Cited in the file of this patent

UNITED STATES PATENTS

| 1,081,949 | Dupont | Dec. 23, 1913 |
| 1,673,675 | Hanciau | June 12, 1928 |

FOREIGN PATENTS

| 243,898 | Germany | Feb. 24, 1912 |

OTHER REFERENCES

Sullivan: "Heavy Liquids for Mineralogical Analysis," U. S. Bureau of Mines, TP 381, 1927, 26 pages, page 8 relied on. (Copy in Scientific Library.)

Whitmore: "Organic Compounds of Mercury," © 1921 by the Chemical Catalog Company, Inc., page 106.